United States Patent
Joanni

(10) Patent No.: US 10,572,610 B2
(45) Date of Patent: Feb. 25, 2020

(54) METHOD FOR DETERMINING A RELIABILITY PARAMETER OF A NEW TECHNICAL SYSTEM

(71) Applicant: Siemens Aktiengesellschaft, München (DE)

(72) Inventor: Andreas Joanni, München (DE)

(73) Assignee: Siemens Aktiengesellschaft (DE)

( * ) Notice: Subject to any disclaimer, the term of this patent is extended or adjusted under 35 U.S.C. 154(b) by 349 days.

(21) Appl. No.: 15/359,744

(22) Filed: Nov. 23, 2016

(65) Prior Publication Data

US 2018/0144072 A1    May 24, 2018

(51) Int. Cl.
    *G06F 17/50*    (2006.01)

(52) U.S. Cl.
    CPC ...... *G06F 17/5009* (2013.01); *G06F 2217/12* (2013.01); *G06F 2217/16* (2013.01)

(58) Field of Classification Search
    CPC ............... G06F 11/008; G06F 17/5009; G06F 2217/12; G06F 2217/16
    See application file for complete search history.

(56) References Cited

U.S. PATENT DOCUMENTS

| | | | | |
|---|---|---|---|---|
| 5,014,220 A | * | 5/1991 | McMann | G06F 11/008 706/45 |
| 6,038,517 A | * | 3/2000 | Dobbins | G06F 11/008 702/82 |
| 9,411,713 B2 | * | 8/2016 | Kikuchi | G06F 11/3676 |
| 10,157,259 B2 | * | 12/2018 | Jo | G01R 31/2856 |
| 10,282,507 B2 | * | 5/2019 | Saraswat | G06F 17/5045 |
| 2010/0313070 A1 | * | 12/2010 | Joshi | G06F 11/008 714/26 |
| 2017/0147738 A1 | * | 5/2017 | Saraswat | G06F 17/5045 |
| 2018/0144072 A1 | * | 5/2018 | Joanni | G06F 17/5009 |

OTHER PUBLICATIONS

A critical look at some point process models for repairable systems; Newby, M.J. Published in: IMA Journal of Mathematics Applied in Business and Industry; pp. 1-12 (Year: 1992).*

(Continued)

*Primary Examiner* — Aniss Chad
(74) *Attorney, Agent, or Firm* — Schmeiser, Olsen & Watts LLP

(57) ABSTRACT

A method for determining a reliability parameter of a new technical system based on assigned failure parameters of m known technical systems is provided, wherein the new technical system comprises $n_1$ devices of a first type, $n_2$ devices of a second type, . . . , and $n_k$ devices of a k-th type; an i-th known technical system out of the m known technical systems, with $1 \leq i \leq m$, has an assigned failure parameter $p_i$ and comprises $n^i_1$ devices of the first type, $n^i_2$ devices of the second type, . . . , and $n^i_k$ devices of the k-th type; and individual failure information relating to the devices of the first to k-th type is initially unknown.

12 Claims, 5 Drawing Sheets

| Known technical system | | | | | | |
|---|---|---|---|---|---|---|
| System failure times | Device type | 1 | 2 | 3 | ... | k |
| $T^i_1, T^i_2, T^i_3, ... T^i_N$ | Number of devices | $n^i_1$ | $n^i_2$ | $n^i_3$ | ... | $n^i_k$ |

(56) References Cited

OTHER PUBLICATIONS

Determining an Approximate Constant Failure Rate For a System Whose Components Have Constant Failure Rates by J. D. Esary et al pp. 1-20 (Year: 1969).*
A Review on Reliability Models With Covariates; Nima Gorjian et al, Proceedings of the 4th World Congress on Engineering Asset Management Athens, Greece Sep. 28-30, 2009; pp. 1-13 (Year: 2009).*
"R: A Language and Environment for Statistical Computing", R Core Team, R Foundation for Statistical Computing, Vienna, Austria, 2016, https://www.R-project.org).
"Proportional Hazard Model" developed by Cox (Cox, D.R. (1972) Regression models and lifetables (with discussion), Journal of the Royal Statistical Society, Series B, 34, 187-220).
Breslow & Day, 1987, Appendix ID.

* cited by examiner

FIG. 2A

| New technical system | | | | | |
|---|---|---|---|---|---|
| Device type | 1 | 2 | 3 | ... | k |
| Number of devices | $n_1$ | $n_2$ | $n_3$ | ... | $n_k$ |

FIG. 2B

| New technical system | | | | | | | | | | | | |
|---|---|---|---|---|---|---|---|---|---|---|---|---|
| Device type | 1 | 2 | 3 | 4 | 5 | 6 | 7 | 8 | 9 | 10 | 11 | 12 |
| Number of devices | 3 | 7 | 2 | 4 | 2 | 3 | 8 | 1 | 7 | 6 | 6 | 5 |

FIG. 3B

| Known technical system | | | | | | |
|---|---|---|---|---|---|---|
| System failure rate | Device type | 1 | 2 | 3 | ... | k |
| $h_i$ | Number of devices | $n_1$ | $n_2$ | $n_3$ | ... | $n_k$ |

FIG. 3C

| New technical system | | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| | 3 | 0 | 1 | 5 | 7 | 3 | 2 | 0 | 8 | 1 | 0 | 0 |
| | | 0 | 1 | 4 | 0 | 6 | 2 | 6 | 5 | 4 | 3 | 0 |
| | | | 0 | 1 | 4 | 6 | 0 | 5 | 2 | 3 | 3 | 1 |

| Known technical system | | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| | 0 | 2 | 7 | 1 | 0 | 1 | 0 | 2 | 3 | 2 | 3 | 0 |

| Device type | 1 | 2 | 3 | ... | k |
|---|---|---|---|---|---|
| Device failure rate | $\beta_1$ | $\beta_2$ | $\beta_3$ | ... | $\beta_u$ |

FIG. 4A

| Known technical system | | | | | | | 12 |
|---|---|---|---|---|---|---|---|
| System failure times | Device type | 1 | 2 | 3 | ... | k | |
| $T_1^i, T_2^i, T_3^i ... T_N^i$ | Number of devices | $n_1^i$ | $n_2^i$ | $n_3^i$ | ... | $n_k^i$ | |

FIG. 3A

Known technical system i = 1 — 16

| | |
|---|---|
| $T_1^1$ | 150h |
| $T_2^1$ | 53984h |
| $T_3^1$ | 52002h |
| ⋮ | ⋮ |
| $T_{100}^1$ | 37879h |

Known technical system i = 64

| | |
|---|---|
| $T_1^{64}$ | 6306h |
| $T_2^{64}$ | 5222h |
| $T_3^{64}$ | 31051h |
| ⋮ | ⋮ |
| $T_{100}^{64}$ | 4762h |

FIG. 3D

| Device type | 1 | 2 | 3 | 4 | 5 | 6 | 7 | 8 | 9 | 10 | 11 | 12 |
|---|---|---|---|---|---|---|---|---|---|---|---|---|
| Device failure rate [fit] | 468 | 4583 | 243 | 538 | 7862 | 73 | 5097 | -147 | 170 | -307 | -7 | 347 |

| Device type | Real failure rate [fit] | 100 failures of each system | | | 1000 failures of each system | | |
|---|---|---|---|---|---|---|---|
| | | Estimated value | Std.-Dev. | P-Value | Estimated value | Std.-Dev. | P-Value |
| 1 | 457 | 467.9 | 205.8 | 0.015 | 469.9 | 63.4 | 0.000 |
| 2 | 4685 | 4583.4 | 247.8 | 0.000 | 4701.1 | 76.9 | 0.000 |
| 3 | 12 | 243.0 | 159.2 | 0.115 | 23.1 | 49.0 | 0.620 |
| 4 | 53 | 537.6 | 207.4 | 0.010 | 68.1 | 64.7 | 0.267 |
| 5 | 1935 | 1861.6 | 217.1 | 0.000 | 1868.0 | 66.9 | 0.000 |
| 6 | 147 | 72.7 | 214.3 | 0.733 | 204.1 | 67.3 | 0.002 |
| 7 | 4832 | 5097.2 | 197.5 | 0.000 | 4717.2 | 59.4 | 0.000 |
| 8 | 1 | -147.6 | 227.3 | 0.501 | -9.0 | 72.2 | 0.897 |
| 9 | 52 | 109.9 | 153.8 | 0.467 | 57.2 | 49.2 | 0.211 |
| 10 | 17 | -301.2 | 181.3 | 0.108 | 59.3 | 58.4 | 0.306 |
| 11 | 60 | -7.3 | 192.5 | 0.969 | -39.0 | 61.5 | 0.512 |
| 12 | 219 | 347.0 | 164.9 | 0.039 | 153.1 | 52.3 | 0.004 |

10,572,610 B2

METHOD FOR DETERMINING A RELIABILITY PARAMETER OF A NEW TECHNICAL SYSTEM

FIELD OF TECHNOLOGY

The following relates to a method for determining a reliability parameter such as a failure rate h of a new technical system based on assigned failure parameters of m known technical systems, without initially knowing individual failure information of devices composing the new and the known technical systems.

BACKGROUND

For the development of new complex technical systems such as voltage switchgears or complex electric circuits, reliable information on the failure behavior of the separate devices of the system is desired in order to evaluate the failure behavior, in particular the failure rate of the entire system. Only then, highly dependable systems satisfying a required safety, or reliability and availability, can be provided. This is sometimes considered important because otherwise, there may arise a risk of economic damages through, e.g. injury to reputation, warrantee claims and contractual penalties, as well as a risk of environmental and personal damages.

Typically, the failure behavior of the separate devices can be expressed as random distributions for the failure time (in case of exponential distribution characterized by parameters such as failure rate or average lifetime before failure). These parameters can be evaluated by performing lifetime tests on the individual devices. However, lifetime tests are not necessarily part of the qualification tests that a manufacturer performs on the manufactured devices, and are not necessarily performed otherwise because this task is time-consuming and expensive. In such case, it is necessary to analyze the entire failing system to find which device caused a system to fail. This is also technically demanding, time-consuming and expensive, especially for complex systems such as voltage switchgears, medical scanners or motors.

In view of the above disadvantages, it is one object of this disclosure to provide improved methods for estimating the reliability of a technical system.

In particular a method for easily determining a failure behavior of a new technical system is desirable. A further objective is to improve the reliability of a new technical system.

SUMMARY

An aspect relates to a method for determining a reliability parameter of a new technical system based on assigned failure parameters of m known technical systems is provided, wherein the new technical system comprises $n_1$ devices of a first type, $n_2$ devices of a second type, . . . , and $n_k$ devices of a k-th type; an i-th known technical system out of the m known technical systems, with $1 \leq i \leq m$, has an assigned failure parameter $p_i$ and comprises $n^i_1$ devices of the first type, $n^i_2$ devices of the second type, . . . , and $n^i_k$ devices of the k-th type; and individual failure information relating to the devices of the first to k-th type is initially unknown; the method comprising the steps of: determining failure rates $\beta_1$ to $\beta_k$ of the devices of the first to k-th type based on the assigned failure parameters of the m known technical systems, and determining the reliability parameter of the new technical system based on the determined failure rates $\beta_1$ to $\beta_k$ of the devices of the first to k-th type.

According to another aspect, a method for manufacturing an optimized new technical system is provided, which comprises the steps of: determining the reliability parameter of a plurality of new technical systems; determining the new technical system out of the plurality of new technical systems for which the reliability parameter is improved; and manufacturing the new technical system for which the reliability parameter is improved, e.g. for which a failure rate h is minimized.

According to another aspect, a method for determining failure rates $\beta_1$ to $\beta_k$ of devices composing m known technical systems is provided, wherein an i-th known technical system out of the m known technical systems, with $1 \leq i \leq m$, has an assigned failure parameter $p_i$ and comprises $n^i_1$ devices of a first type, $n^i_2$ devices of a second type, . . . , and $n^i_k$ devices of a k-th type; and individual failure information relating to the devices of the first to k-th type are initially unknown; the method comprising the steps of determining the failure rates $\beta_1$ to $\beta_k$ of the devices of the first to k-th type based on the assigned failure parameters of the m known technical systems.

According to another aspect, an apparatus for determining a reliability parameter of a new technical system based on assigned failure parameters of m known technical systems is provided, wherein the new technical system comprises $n_1$ devices of a first type, $n_2$ devices of a second type, . . . , and $n_k$ devices of a k-th type; an i-th known technical system out of the m known technical systems, with $1 \leq i \leq m$, has an assigned failure parameter $p_i$ and comprises $n^i_1$ devices of the first type, $n^i_2$ devices of the second type, . . . , and $n^i_k$ devices of the k-th type; and individual failure information relating to the devices of the first to k-th type is initially unknown; the apparatus comprising: a storage unit for storing the values of $n_1$ to $n_k$, the values of $n^i_1$ to $n^i_k$ and the assigned failure parameter $p_i$ of the i-th known technical system; a calculating unit for determining failure rates $\beta_1$ to $\beta_k$ of the devices of the first to k-th type based on the assigned failure parameters of the m known technical systems, and for determining the reliability parameter of the new technical system based on the determined failure rates $\beta_1$ to $\beta_k$ of the devices of the first to k-th type.

BRIEF DESCRIPTION

Some of the embodiments will be described in detail, with reference to the following figures, wherein like designations denote like members, wherein:

FIG. 2A shows a new dataset including composition information of the technical system of FIG. 1;

FIG. 2B shows another new dataset including composition information of the technical system of FIG. 1;

FIG. 3A shows a first known dataset including composition information of known technical systems;

FIG. 3B shows a second known dataset including composition information of known technical systems;

FIG. 3C shows a third known dataset including composition information of known technical systems;

FIG. 3D shows a fourth known dataset including composition information of known technical systems;

FIG. 4A shows a first table including calculated device failure rates;

In the Figures, like reference numerals designate like or functionally equivalent elements, unless otherwise indicated.

DETAILED DESCRIPTION

Figure 1:
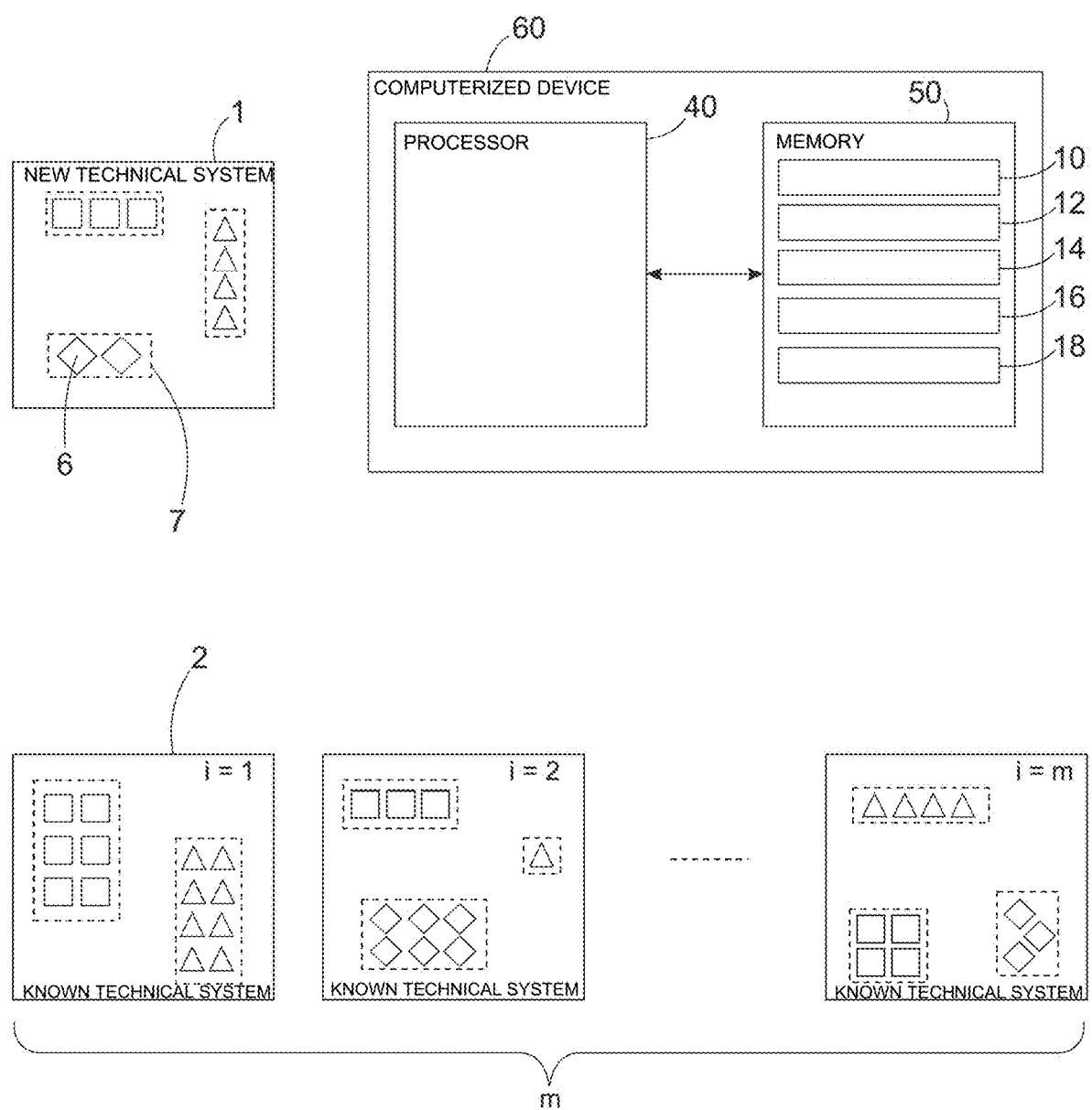
FIG. 1 shows a schematic representation of an embodiment of a technical system, of m known technical systems, and of a computerized device.

It is understood that a technical system comprises entities that may interact through natural forces. Natural forces, e.g. include electricity, magnetism and gravitation, and the entities can be palpable. In this disclosure a new technical system is a complex system comprising a plurality of devices. For example, the new technical system may be a voltage switch-gear, an automobile or an electric circuit. The devices or components of the new technical system are any entities that make up the new technical system, for example memory chips, capacitors, resistors, processors, batteries or the like.

The devices of the new technical system may be divided into n device types or categories, such that the new technical system comprises $n_1$ devices of a first type, $n_2$ devices of a second type, and so on up to $n_k$ devices of a k-th type, wherein the number of devices $n_1$ to $n_k$ of each type is 1 or above. A composition of the new technical system, which is given by the number of devices $n_1$ to $n_k$ of each type, can be assumed as known.

The division of the devices into different types may occur on different levels: for example, the device type "resistors" may enclose all resistors of the new technical device, i.e. resistors having any resistance value (such as 15Ω, 20Ω, etc), all resistors having a resistance value within a given range (such as 15Ω to 20Ω), or all resistors having a specific value (such as 15Ω). Preferably, there are at least two device types.

The m known technical systems are, for example, similar to the new technical system and are preferably technical systems of the same kind as the new technical system. In detail, if the new technical system is a complex electric circuit, it is preferable to choose the known technical systems to also be complex electric circuits. Alternatively, the m known technical systems might be different from the new technical system as long as the device types of the new technical system can be found in the ensemble of the known technical systems, ideally in different compositions. Each of the m known technical systems may be labelled as the first known technical system, the second known technical system, . . . , and the m-th known technical system, or more generally as the "i-th known technical system", with $1 \leq i \leq m$. The i-th known technical system is divided into the same k device types or categories as the new technical system. However, the number of devices of each type is not necessarily the same as for the new technical system.

In embodiments, the number of devices of at least one device type differs between the known and the new technical system. More generally, the i-th known technical system comprises $n^i_1$ devices of the first type, $n^i_2$ devices of the second type, and so on up to $n^i_k$ devices of the k-th type. The number of devices $n^i_1$ to $n^i_k$ of the first to k-th type is preferably an integer number that is greater or equal to zero, and at least one number of devices $n^i_1$ to $n^i_k$ of the first to k-th type is non-zero.

For example, a composition of the i-th known technical system, which is given by the number of devices $n^i_1$ to $n^i_k$ of each type, is known. Moreover, said composition is different from the composition of the new technical system. Preferably, the i-th known technical system does not comprise any devices that do not belong to any of the k device types. Preferably, the number m of known technical systems is large, for example, it is greater than 50. Preferably, the compositions of the m known technical systems is as varied as possible. Preferably, the composition of each of the m known technical systems is different.

The reliability parameter of the new technical system is a parameter indicating the failure behavior of the new technical system, namely how reliable the new technical system is, or equivalently, how prone it is to failure. In embodiments, the reliability parameter of the new technical system is preferably a failure rate h of the new technical system or an averaged failure time of the new technical system. Alternatively, the reliability parameter of the new technical system might, for example, be a percentage of new technical systems that will not have failed at a given threshold time, or the like.

The assigned failure parameter $p_i$ of the i-th known technical system is a parameter expressing the failure behavior of the i-th known technical system. In embodiments, the assigned failure parameter $p_i$ of the i-th known technical system might be an observed or an already known parameter, and indicates the failure rate $h_i$ assigned to the i-th known technical system, or at least one failure time $T^i$ assigned to the i-th known technical system. One may contemplate of a plurality of failure times per known technical system.

The individual failure information relating to the devices of the first to k-th type corresponds to any kind of information concerning the failure behavior of the individual devices. In embodiments, the individual failure information relating to the devices of the first to k-th type is a failure time of the devices of the first to k-th type, or the failure rate $\beta_1$ to $\beta_k$ of the devices of the first to k-th type. The individual failure information, and more specifically the failure rate $\beta_1$ to $\beta_k$ of the devices of the first to k-th type might be time-independent or time-dependent.

Generally speaking, the (constant or non-constant) failure rate of a system or device is a parameter expressing the random failure behavior of said system or device. For the special case of an exponentially distributed failure time, the constant failure rate of a system multiplied by a given time period may be contemplated as being the average number of systems or devices failing or breaking down within the given time period, provided that failed systems or devices are replaced immediately after failure. Here, since a single system or device is considered at a time, the constant failure rate is the inverse of the average failure time of said system or device, which is another parameter expressing the failure behavior of said system or device. The realization of the failure time of the system or device relates to the time at which the system or device breaks down or fails to function, starting from a reference time such as a time of first use of the system or device or a time of fabrication of the system or device. The failure time of the system or device may be assumed equivalent to the lifetime of the system or device as the latter corresponds to the time during which the system or devices functions without failing or breaking down, starting from the reference time.

In embodiments, the failure time is expressed in seconds or hours while the failure rate is expressed as the FIT (Failures In Time) rate. The FIT rate of a system or device is the number of failures that can be expected in one billion ($10^9$) hours of operation of the system or device.

The reliability parameter, and in particular the failure rate h of the new technical system is initially unknown. Individual failure information, and in particular failure rates $\beta_1$ to $\beta_k$ of the devices of the first to k-th type respectively are also initially unknown. In addition, the assigned failure parameter relating to the i-th known technical system is known. Preferably, said assigned failure parameter relating to the i-th known technical system is stored in datasets at a time at which a user of the i-th known technical system notices a failure of the i-th known technical system. Preferably, the dataset in which the assigned failure parameters relating to the m known technical system are stored is regularly or continuously updated when users report a failure to the manufacturer.

The failure rates ($\beta_1$ to $\beta_k$ of the devices of the first to k-th type are calculated only based on the assigned failure parameters with corresponding failure times or failure rates of the m known technical systems and on the composition information of the known technical systems. In other words, failure rates on the device level ($\beta_1$ to $\beta_k$) can be calculated from assigned failure parameters on the system level, without requiring or using any information about the individual failure rates $\beta_1$ to $\beta_k$ of the devices of the first to k-th type. Hence, device level information is obtained solely from system level information. In particular, this means that it is generally not necessary to experimentally determine individual failure information, i.e. the failure rate or the failure behavior of each device individually. Hence, reliably determining the failure rates $\beta_1$ to $\beta_k$ of the devices of the first to k-th type is greatly simplified, with a decreased cost in time and effort. Moreover, one may contemplate of updating datasets including assigned failure parameters of known technical systems. With the continuous update of the dataset comprising the assigned failure parameters of the known technical systems, the values of the failure rates $\beta_1$ to $\beta_k$ of the devices of the first to k-th type become more and more accurate with little effort.

In embodiments, the reliability parameter of the new technical system is calculated by combining the composition information of the new technical system with the calculated failure rates $\beta_1$ to $\beta_k$ of the devices of the first to k-th type. The reliability parameter of the new technical system is thus obtained only from the assigned failure parameters of the known technical systems and on the composition of the new and known technical systems, without requiring knowing the failure rates or any other information about the failure behavior of the individual devices composing the new and known technical systems. Hence, determining the individual failure information, in particular the individual failure rates of the individual devices by analyzing the entire failing system to find which device caused a system to fail is unnecessary, and the reliability parameter of the new technical system can be reliably obtained in a simplified manner, involving a decrease in costs and time.

The manufacturer of the new technical system can thereby reliably provide information on the failure behavior of the newly manufactured system, in particular by indicating the calculated reliability parameter, for example as an estimated failure rate of the new technical system or by providing a time range within which the new technical system is expected to fail based on the calculated failure rate. Thereby, reliability and availability of the new technical system can be guaranteed, and maintenance of the new technical system can be planned in advance including provision of an appropriate number of spare parts.

Further, a lifetime of the new technical system can be maximized by optimizing the design of the new technical system on a device level in order to decrease the failure rate of the entire new technical system. Not only is this financially beneficial, it is further more respectful of the environment as unnecessary waste of systems or devices can be avoided.

Moreover, with the optional continuous update of the dataset comprising the assigned failure parameters of the known technical systems and the increase in accuracy of the failure rates $\beta_1$ to $\beta_k$ of the devices of the first to k-th type resulting therefrom, the reliability parameter such as the failure rate h of the new technical system can be determined with increased accuracy.

According to another embodiment, the assigned failure parameter $p_i$ of the i-th known technical system is only known for times more recent or equal to a predetermined censoring time.

Accordingly, the assigned failure parameter, in particular the failure time of the i-th known technical system is only known when the i-th known technical system fails before or at the predetermined censoring time. The assigned failure parameter is not defined for a system failing after the predetermined censoring time. Rather, a non-defined failure time indicates that the i-th known technical system has not failed up to the predetermined censoring time. Preferably, the predetermined censoring time is large, for example, it is 10 years or above. This is particularly useful when using right censored or incomplete assigned failure parameter data. Alternatively, left censored data, interval censored data or arbitrarily censored data might be used.

According to another embodiment, a failure rate $h_i$ of the i-th known technical system is equal to the sum of the products of the failure rates $\beta_1$ to $\beta_k$ and the number of devices $n^i_1$ to $n^i_k$. In particular, the failure rates $\beta_1$ to $\beta_k$ of the devices of the first to k-th type are determined using that the failure rate $h_i$ of the i-th known technical system is equal to the sum of the products of the failure rates $\beta_1$ to $\beta_k$ and the number of devices $n^i_1$ to $n^i_k$. This assumes that the known technical system is a series system.

In other words, it is assumed that for the i-th known technical system, the following equation (1) holds:

$$h_i = \sum_{j=1}^{k} \beta_j n^i_j \tag{1}$$

wherein j is an index for summing, with $1 \leq j \leq k$. This equation is derived from Aalen's so-called "Additive Hazard Model", which will be described later.

Here, since there are m known technical systems, a system of m such equations (1) is obtained. Knowing the assigned failure parameter with corresponding failure times and the number of devices $n^i_1$ to $n^i_k$ of each type in the i-th known technical system, the system of m equations can then be solved for $\beta_1$ to $\beta_k$.

According to another embodiment, a failure rate h of the new technical system is equal to the sum of the products of the failure rate $\mu_1$ to $\mu_k$ and the number of devices $n_1$ to $n_k$. In particular, the failure rate h of the new technical system is determined using that the failure rate h of the new technical system is equal to the sum of the products of the failure rate $\beta_1$ to $\beta_k$ and the number of devices $n_1$ to $n_k$.

As for the i-th known technical system, it is assumed that the following equation (2) holds for the new technical system:

$$h = \sum_{j=1}^{k} \beta_j n_j \qquad (2)$$

wherein j is an index for summing, with $1 \leq j \leq k$. This equation is derived from Aalen's so-called "Additive Hazard Model", which will be described later.

Here, the calculated values for $\beta_1$ to $\beta_k$ can be plugged into equation (2) to readily obtain the value for the failure rate h of the new technical system. The reliability parameter of the new technical system is then determined based on the calculated value for the failure rate h of the new technical system h According to another embodiment, the failure rates $\beta_1$ to $\beta_k$ of the devices of the first to k-th type and the reliability parameter of the new technical system are determined using a numerical tool.

The numerical tool is a mean for performing a numerical analysis for determining the failure rates $\beta_1$ to $\beta_k$ of the devices of the first to k-th type and the reliability parameter of the new technical system. Preferably, the numerical tool is a statistical tool, such as the statistical programming language R. Preferably, the statistical tool can be implemented on a computational device such as a computer or the like. Preferably, the statistical tool allows performing statistical analysis on the basis of the Additive Hazard Model, described later.

Alternatively, the statistical tool might implement a Maximum Likelihood Estimator under the assumption that the failure rates of all devices, except a device of interest, are zero. However, the latter method provides rather poor results compared to the Additive Hazard Model.

According to another embodiment, the method further comprises the step of collecting the assigned failure parameter $p_i$ relating to the i-th known technical system prior to the steps of determining the failure rates $\beta_1$ to $\beta_k$ of the devices of the first to k-th type and the reliability parameter of the new technical system.

The collecting step is preferably performed by keeping track of assigned failure parameters, in particular of failure times of the known technical systems. For example, information on failure behavior for the i-th known technical system might be added to a dataset when the user of the i-th known technical system detects a failure of the i-th known technical system and informs the manufacturer thereof.

Preferably, the datasets are continuously updated, which brings about the advantages described above.

According to another embodiment, the failure rates $\beta_1$ to $\beta_k$ of the devices of the first to k-th type and the reliability parameter of the new technical system are determined using the Additive Hazard Model.

The Additive Hazard Model, which was already mentioned above, is an alternative approach to the broadly used statistical "Proportional Hazard Model" developed by Cox (Cox, D. R. (1972). "Regression models and lifetables (with discussion)", Journal of the Royal Statistical Society, Series B, 34, 187-220). Said Additive Hazard Model has been developed by Aalen at the end of the 1980s for use in biomedical statistics, especially for studying the association between risk factors and disease occurrence or death. For example, Breslow and Day suggested using the model to determine the risk of developing carcinoma of the bronchi and nasal sinuses in employees of a nickel refinery (Breslow & Day, 1987, Appendix ID).

A time-invariant formulation of the Additive Hazard Model, which assumes that the failure rate ($\beta_1$ to $\beta_k$ of the devices of the first to k-th type are time-invariant, is given in the following equation (3):

$$h_i = \beta_0 + \sum_{j=1}^{k} \beta_j n_j \qquad (3)$$

When setting $\beta_0$ to zero, the former equations (1) and (2) are easily obtained.

Different statistical software packages implement the described Additive Hazard Model and are hence adequate in determining the failure rate, and hence the reliability parameter of the new technical system. For example, the numerical statistical programming language R ("R: A Language and Environment for Statistical Computing", R Core Team, R Foundation for Statistical Computing, Vienna, Austria, 2016, https://www.R-project.org) comprises packages for implementing the Additive Hazard Model, namely the packages "timereg" and "survival", and may thus be used to implement the claimed method.

According to another embodiment, a lifetime distribution of the devices of the first to k-th type follows an exponential distribution.

The use of the Additive Hazard Model assumes that the failure rate of the individual devices can be modeled by an exponential distribution function. This is particularly accurate when the failure events can be considered as events in a homogeneous Poisson process, i.e. in a process in which events occur continuously and independently at a constant average rate.

If the statistical tool simulates a model different to the Additive Hazard Model, the lifetime distribution of the devices might follow a different distribution, such as a Weibull distribution.

According to another embodiment, the new technical system is an electric circuit comprising, as its devices, a plurality of electrical components.

Preferably, the electric circuit is a complex electric circuit mounted on a PCB (Printed Circuit Board) and comprising a plurality of devices such as resistors, capacitors, transistors, diodes, or other electrical components.

According to another embodiment, a device of a p-th device type, with $1 \leq p \leq k$, comprises at least two sub-devices having intercorrelated individual failure information.

In other words, one of the devices belonging to the new technical system comprises two or more sub-devices having individual failure information, for example failure rates, depending from one another. The failure of one sub-device might influence the failure of another sub-device forming the same device. Consider for example a device comprising, as sub-devices, a resistor and a diode arranged in series. If the resistor fails, the current flow through the diode will increase and might in turn cause it to fail.

According to yet another embodiment, a method for manufacturing a new technical system is provided, which comprises the steps of: determining the reliability parameter of a plurality of new technical systems; determining the new technical system out of the plurality of new technical systems for which the reliability parameter is improved, e.g. minimized; and manufacturing the new technical system for which the reliability parameter is improved, e.g. minimized.

A plurality of different new technical systems are, in particular mentally, designed, and for each new technical system, a reliability parameter, preferably a failure rate h, is calculated. The reliability parameter of the different new technical systems may depend on the composition of the different new technical systems. The new technical system with the smallest reliability parameter is expected to have the longest average lifetime and is hence produced. Thereby, the present method allows reducing the reliability parameter of the new technical system, and producing a new technical system with an optimized lifetime. This goes with less use of natural resources, time and financial effort.

According to yet another embodiment, a method for determining failure rates $\beta_1$ to $\beta_k$ of devices composing m known technical systems is provided, wherein an i-th new technical system out of the m known technical systems, with $1 \leq i \leq m$, has an assigned failure parameter $p_i$ and comprises $n^i_1$ devices of a first type, $n^i_2$ devices of a second type, . . . , and $n^i_k$ devices of a k-th type; and individual failure information relating to the devices of the first to k-th type are initially unknown; the method comprising the steps of determining the failure rates $\beta_1$ to $\beta_k$ of the devices of the first to k-th type based on the assigned failure parameters of the m known technical systems.

Accordingly, it is possible to determine the failure rates of the individual devices forming the m known technical systems only with the knowledge of the composition and assigned failure parameters with corresponding failure times of each known technical system. This may be useful in designing an optimized new technical system, with an improved reliability parameter, in particular with a minimized failure rate.

The respective entity, e.g. the processing entity, may be implemented in hardware and/or in software. If said entity is implemented in hardware, it may be embodied as a device, e.g. as a computer or as a processor or as a part of a system, e.g. computer system. If said entity is implemented in software it may be embodied as a computer program product, as a function, as a routine, as a program code or as an executable object.

According to a further aspect, the invention relates to a computer program product comprising a program code for executing the above-described method for determining a reliability parameter of a new technical system when run on at least one computer.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

Further possible implementations or alternative solutions of the invention also encompass combinations—that are not explicitly mentioned herein—of features described above or below with regard to the embodiments. The person skilled in the art may also add individual or isolated aspects and features to the most basic form of embodiments of the invention.

Further embodiments, features and advantages of the present invention will become apparent from the following description of the accompanying figures.

Computerized devices can be suitably designed for implementing embodiments of the present invention as described herein. FIG. 1 shows a schematic representation of the new technical system 1, together with such a computerized device 60, e.g. a general purpose computer. The computerized device is implemented to carry out a variant of a method for estimating a lifetime, reliability, stability and/or effectiveness of a new technical system to be designed or manufactured.

The envisaged new technical system 1 comprises a plurality of devices 6, divided into k=3 types 7. In the new technical system of FIG. 1, the first device type 7 comprises 3 devices 6 represented by squared, the second device type 7 comprises 2 devices 6 represented by diamond shapes, and the third device type 7 comprises 4 devices 6 represented by triangles. Moreover, FIG. 1 shows a plurality m of known technical systems 2, 3 of which are represented in the figure (i=1, 2 and m). Each of the m known technical systems 2 comprises a plurality of devices 6 divided into the same k=3 types as devices of the new technical system 1. The composition of each of the known technical systems 2 is shown in FIG. 1. For example, the first known technical system 2 (i=1) comprises 6 devices 6 of the first device type 7 represented by squares, 8 devices 6 of the second type 7 represented by diamond shapes, and zero devices 6 of the third type 7 represented by triangles. Although the second to m-th known technical system are not provided with a reference sign, they are, of course, structured similarly to the first known technical system 2. Obviously, the composition of the new and known technical systems 1, 2 are here only taken as examples, and might be arbitrary.

Further, FIG. 1 shows the computerized device or computer 60 with a memory 50, which can include any one or combination of volatile memory elements (e.g., random access memory) and nonvolatile memory elements. Moreover, the memory 50 may incorporate electronic, magnetic, optical, and/or other types of storage media. Note that the memory 50 can have a distributed architecture, where various components are situated remote from one another, but can be accessed by a processor 40. The memory 50 stores software 20 and various datasets 10, 12, 14.

The processor 40 is a hardware device for executing software, particularly that stored in memory 50. The processor 40 can be any custom made or commercially available processor, a central processing unit (CPU), an auxiliary processor among several processors associated with the computer 60, or generally any device for executing software instructions.

The software 20 in memory 50 may include one or more separate programs, each of which comprises an ordered listing of executable instructions for implementing logical functions. In the example of FIG. 1, the software 20 in the memory 50 includes methods described herein in accordance with exemplary embodiments. In detail, the software 20 includes a numerical tool, here the statistical programming language R with the packages "survival" and "timereg" for performing statistical analysis on the basis of Aalen's Additive Hazard Model.

The contents of the datasets 10, 12, 14 in memory 50 is elucidated in the following description of FIGS. 2A to 4B.

FIGS. 2A and 2B show the new dataset 10 comprising composition information of the new technical system 1, which is saved in a memory 50. In detail, FIG. 2A shows a generic new dataset 10 showing the general structure or composition of the new technical system 1. In detail, dataset 10 indicates that the new technical system 1 comprises $n_1$ devices of a first type, $n_2$ devices of a second type, $n_3$ devices of a third type, ..., and $n_k$ devices of a k-th type. Values for the number of devices in the k device types can be determined based on a construction plan of the new technical system and entered into a spreadsheet by a user, for example.

In FIG. 2B, the new dataset 10 has been filed with such information from the construction plan of the new technical system. In detail, the devices of the new technical system are divided into k=12 types, labelled types 1 to 12 (first row). Each device type comprises a defined number of devices (second row). Namely, the first type of devices comprises 3 devices, the second type of devices comprises 1 device, the third type of devices comprises 2 devices, ..., and the $12^{th}$ type of devices comprises 5 devices. The filed new dataset table 10 is stored in the memory 50.

FIGS. 3A, 3B, 3C and 3D show the known dataset 12 comprising composition information of the m known technical systems 2. FIGS. 3A and 3B show a generic known dataset, which is saved in the memory 50 and shows the general structure or composition of the i-th known technical system 2. In detail, dataset table 12 indicates that the i-th known technical system 2 comprises $n^i_1$ devices of the first type, $n^i_2$ devices of the second type, $n^i_3$ devices of the third type, ..., and $n^i_k$ devices of the k-th type. The k device types are identical to those of the new technical system. Values for the number of devices in the k device types can be determined based on the construction plan of the known technical system. Further, dataset table 12 includes assigned failure parameters for the i-th known technical system, which may be either represented as failure times $T^i_1, T^i_2, T^i_3, \ldots, T^i_N$, as shown in FIG. 3A, or alternatively as a failure rate $h_i$, as shown in FIG. 3B.

Information about the known technical systems 2, in particular composition information and failure information, is preferably stored as datasets 12, 16 in the memory 50.

The applicant carried out investigations on the failure behavior and collected respective data which is reproduced here and used for exemplifying the explained methods and devices.

FIG. 3C shows examples of known dataset tables 12 for 64 known technical systems 2. The number of device types k is the same as for the new technical system 1, the composition of which is shown in FIG. 2B. Namely, the devices of the known technical system 2 are divided into k=12 types, as indicated in the first row of table 12 in FIG. 3C. Below each device type is indicated the number of devices of said type. Namely, the first known technical system (i=1) contains 3 devices of the first type, 0 devices of the second type, 1 device of the third type, etc. Similarly, the second known technical system (i=2) contains 0 devices of the first type, 1 device of the second type, 4 devices of the third type, etc. Each of the m known technical systems has a similar composition, up to the 64-th known technical system (i=64), which comprises 0 devices of the first type, 2 devices of the second type, 7 devices of the third type, etc. Further, failure times data table 16 in FIG. 3D provides, for each of the 64 known technical systems 2, an assigned failure parameter expressed as a plurality of failure times. For each known technical system, 100 failure times are stored in table 16. In detail, in FIG. 3D, for the $64^{th}$ known technical system, the first observed or assigned failure time is 6306 hours, the second failure time is 5222 hours, etc.

The processor 40 accesses the software 20 from memory 50 and receives, as input data for implementing the software 20, the information contained in datasets 12 and 16, i.e. the failure times and the composition of each of the m known technical systems 2. A calculating unit from the processor 40 then calculates, based on the Additive Hazard Model of the software 20, the failure rates $\beta_1$ to $\beta_k$ of the devices of the first to k-th device type, and stored the calculated values as a table 14 in the memory 50.

Figures 4B, 5, 6:
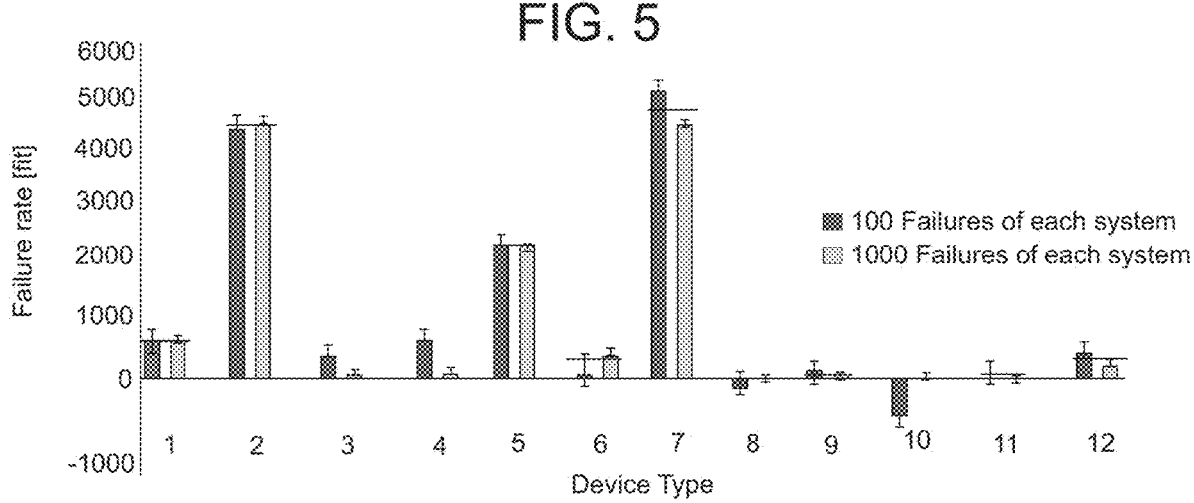
FIG. 4B shows a second table including calculated device failure rates.
FIG. 5 shows a table for comparing the calculated failure rates of each device type to the real failure rates of each device type.
FIG. 6 shows a bar chart representing the difference between the calculated failure rates of each device type based on 100 and 1000 simulated failures of each system, and the real failure rates of each device type.

FIGS. 4A and 4B show the table 14 comprising calculated device failure rates. In detail, FIG. 4A shows a general table 14, in which the failure rate $\beta_1$ to $\beta_k$ of each device type is stored with the corresponding device type 1 to k. Said table 14 might be filed with the values calculated by the numerical device 40, as shown in FIG. 4B. Namely, for each device type 1 to 12, the corresponding calculated failure rate is stored. Here, by means of an example, the failure rate of the first device type is 468 FIT, the failure rate of the second device type is 4583, etc.

The processor 40 in FIG. 1 uses the information stored in table 14 to determine the yet unknown failure rate h of the new technical system 1, again using the Additive Hazard Model from the software 20.

FIG. 5 shows a table for comparing the calculated failure rates of each device type to the real failure rates of each device type. Thereby, the accuracy of the calculated values of the failure rates $\beta_1$ to $\beta_k$ of the devices of the first to k-th device type can be analyzed.

To obtain table of FIG. 5, 64 known technical systems with known composition are considered. Then, for each known technical system, 100 (or respectively 1000) observed values for failure times of the known technical system observed by users are obtained by means of stochastic simulation. In other words, for the i-th known technical system, with $1 \le i \le 64$, 100 (or respectively 1000) system failures are observed.

For each device type 1 to 12, the processor 40 calculates an estimated value for the failure rate of the devices of that device type ($\beta_1$ to $\beta_{12}$), as well as a corresponding standard deviation and P-value. Here, the real failure rate of each device type is known. It is assumed that failure rates are constant, i.e. time invariant. For example, it is measured experimentally by determining which device is at the origin of a failure in a known technical system. The table of FIG. 5 hence puts the real or expected failure rate of each device type, and the estimated values thereof for 100 and 1000 known technical system failures side to side. With the help of the bar chart of FIG. 6, a direct comparison and judgment of the results can be performed.

In detail, in FIG. 6, the dark bars show the calculated failure rate obtained using 100 failures for each known technical system and the light bars show the calculated failure rate obtained using 1000 failures for each known technical system, with their respective standard deviations. Further, the horizontal bars show, for each device type, the real failure rate of the devices of that type.

As can be seen from the bar chart in FIG. 6, for both the simulation using 100 and 1000 failures per known technical system, the real failure rate of each device type mostly lies within less than one standard deviation from the calculated values for the failure rate of the devices of each device type. In particular, for the simulation using 1000 failures, the real value of the device failure rate always lies within less than one standard deviation from the calculated value.

As can be gathered from FIG. 5, the high P-value for small device failure rates shows that it is difficult to detect and accurately give a numerical value to such small device failure rates. However, the accuracy of these small device failure rates is unimportant as these barely contribute to the total failure rate of the technical system.

Further, negative failure rates are obviously technically ruled out. These are mainly present when using a small number of failures per known technical system, such as 100 failures per known technical system, and are less present for larger numbers of failures per system, such as 1000 failures per known technical system. Hence, large amounts of data reflecting the failures of the technical systems are necessary for good results. Actually, the negative failure rates are due to the use of a statistical model that is designed for other purposes, such as medical statistics. It could be a further object to modify the statistical method to eliminate such negative failure rates.

However, with the present method, very satisfying results for the device failure rates using 1000 failures per known technical system are obtained, as indicated by a combination of FIGS. 5 and 6.

Figure 7:
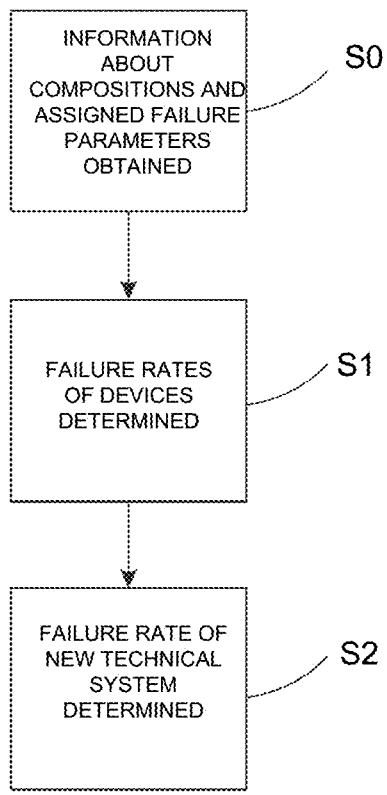
FIG. 7 shows a flowchart representing an embodiment of the method for determining a failure rate h of a new technical system.

FIG. 7 shows a flowchart representing a variant of the method for determining a failure rate h of a new technical system. In detail, in step S0, the information about the compositions and the assigned failures parameters of the m known technical systems is obtained from stored datasets 12 and 16. Following therefrom, in step S1, the failure rates $\beta_1$ to $\beta_k$ of the devices of the first to k-type are determined by the numerical device 40. Then, in step S2, the failure rate h of the new technical system is determined by the numerical device 40.

Figure 8:
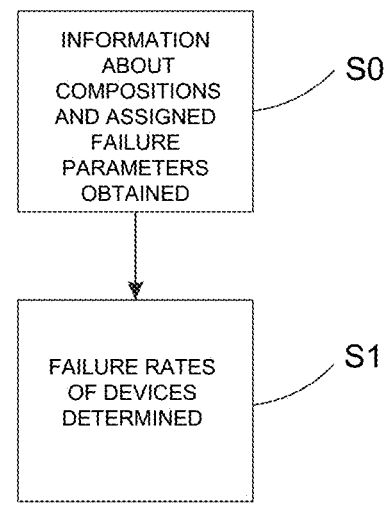
FIG. 8 shows a flowchart representing an embodiment of the method for determining failure rates $\beta_1$ to $\beta_k$ of devices composing m known technical systems.

FIG. 8 shows a flowchart representing a variant of the method for determining failure rates $\beta_1$ to $\beta_k$ of devices composing m known technical systems. In detail, in step S0, the information about the compositions and the assigned failures parameters of the m known technical systems is obtained from stored datasets 12 and 16. Following therefrom, in step S1, the failure rates $\beta_1$ to $\beta_k$ of the devices of the first to k-type are determined by the numerical device 40.

Although the present invention has been described in accordance with preferred embodiments, it is obvious for the person skilled in the art that modifications are possible in all embodiments. For example, the number of device types k might be smaller or greater than 12, the number of known technical systems might be smaller or greater than 64, and the composition of the new and known technical devices might be any.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for determining a reliability parameter of a new technical system wherein the new technical system includes n1 devices of a first type, n2 devices of a second type, . . . , and $n_k$ devices of a k-th type, the method comprising:

retrieving a plurality of stored assigned failure parameters of m known technical systems, wherein an i-th known technical system out of the m known technical systems, with 1≤i≤m, has an assigned failure parameter $p_i$ and includes $n^i_1$ devices of the first type, $n^i_2$ devices of the second type, . . . , and $n^i_k$ devices of the k-th type; wherein each of the plurality of assigned failure parameters is a failure rate of an i-th known technical system of the m known technical systems, wherein each of the plurality of assigned failure parameters does not include individual failure rates of $n^i_1$ devices of the first type, $n^i_2$ devices of the second type, . . . , and $n^i_k$ devices of the k-th type of the i-th known technical system, wherein each of the plurality of assigned failure parameters does not include individual failure times of $n^i_1$ devices of the first type, $n^i_2$ devices of the second type, . . . , and $n^i_k$ devices of the k-th type of the i-th known technical system;

determining individual failure rates $\beta_1$ to $\beta_k$ of each of the devices of the first to k-th type based on each of the plurality of assigned failure parameters being equal to a sum of the products of the failure rates $\beta_1$ to $\beta_k$ and the number of devices $n^i_1$ to $n^i_k$;

determining the reliability parameter of the new technical system, based on the failure rate h of the new technical system being equal to a sum of the products of the failure rate $\beta_1$ to $\beta_k$ and the number of devices $n_1$ to $n_k$, wherein the reliability parameter of the new technical system is a system failure rate of the new technical system; and performing at least one of the group including manufacturing the new technical system, and providing spare parts for the new technical system based on the determined reliability parameter.

2. The method according to claim 1, wherein the assigned failure parameter $p_i$ of the i-th known technical system is only known for times more recent or equal to a predetermined censoring time.

3. The method according to claim 1, wherein the failure rates $\beta_1$ to $\beta_k$ of the devices of the first to k-th type and the reliability parameter of the new technical system are determined using a numerical tool.

4. The method according to claim 1, further comprising the step of collecting the assigned failure parameter $p_i$ relating to the i-th known technical system prior to the steps of determining the failure rates $\beta_1$ to $\beta_k$ of the devices of the first to k-th type and the reliability parameter of the new technical system.

5. The method according to claim 1, wherein the failure rates $\beta_1$ to $\beta_k$ of the devices of the first to k-th type and the reliability parameter of the new technical system are determined using an Additive Hazard Model.

6. The method according to claim 1, wherein a lifetime distribution of the devices of the first to k-th type follows an exponential distribution.

7. The method according to claim 1, wherein the new technical system is an electric circuit comprising a plurality of electrical components including the n1 devices of a first type, n2 devices of a second type, . . . , and $n_k$ devices of a k-th type.

8. The method according to claim 1, wherein a device of a p-th device type, with 1≤p≤k, comprises at least two sub-devices having intercorrelated individual failure information.

9. A method for manufacturing an optimized new technical system, comprising the steps of:

determining the reliability parameter of a plurality of new technical systems using the method of claim 1;

determining the optimized new technical system out of the plurality of new technical systems for which the reliability parameter is improved; and wherein the new technical system of the performing at least one of the group including manufacturing the new technical system, and providing spare parts for the new technical system based on the determined reliability parameter is the optimized new technical system.

10. The method of claim 9, wherein the determining the optimized new technical system out of the plurality of new technical systems for which the reliability parameter is improved, includes optimizing the design of the new technical system on a device level such that the reliability parameter of the entire new technical system is maximized based on the reliability parameter of the plurality of new technical systems.

11. The method of claim 1 further comprising continuously updating the assigned failure parameters of m known technical systems with new assigned failure parameters of the m known technical systems.

12. The method of claim 1, further comprising collecting additional assigned failure parameters of m known technical systems;
- re-determining failure rates $\beta_1$ to $\beta_k$ of the devices of the first to k-th type based on each of the plurality of assigned failure parameters being equal to a sum of the products of the failure rates $\beta_1$ to $\beta_k$ and the number of devices $n^i_1$ to $n^i_k$; and
- re-determining the reliability parameter of the new technical system based on the failure rate h of the new technical system being equal to a sum of the products of the failure rate $\beta_1$ to $\beta_k$ and the number of devices $n_1$ to $n_k$, wherein the reliability parameter of the new technical system is a system failure rate of the new technical system.

* * * * *